(12) United States Patent
Wiese et al.

(10) Patent No.: US 8,431,192 B2
(45) Date of Patent: Apr. 30, 2013

(54) METHODS OF FORMING PROTECTING COATINGS ON SUBSTRATE SURFACES

(75) Inventors: Gabriela Wiese, Lachendorf (DE); Hendrik John, Celle (DE); Sven van Delden, Lachendorf (DE); Jan Tomczak, Nienhagen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/177,803

(22) Filed: Jul. 7, 2011

(65) Prior Publication Data

US 2013/0011659 A1 Jan. 10, 2013

(51) Int. Cl.
*B05D 1/38* (2006.01)

(52) U.S. Cl.
USPC ..... 427/407.1; 427/379; 427/384; 427/385.5; 427/409; 427/412.1

(58) Field of Classification Search .......... None
See application file for complete search history.

(56) References Cited

U.S. PATENT DOCUMENTS

| | | | |
|---|---|---|---|
| 3,324,069 A | 6/1967 | Koblitz et al. | |
| 3,340,222 A | 9/1967 | Fang | |
| 3,572,451 A | 3/1971 | Copeland | |
| 3,971,447 A | 7/1976 | Ahlberg et al. | |
| 4,036,539 A | 7/1977 | Saunders et al. | |
| 4,049,863 A | 9/1977 | Vassiliou | |
| 4,087,394 A | 5/1978 | Concannon | |
| 4,151,317 A | 4/1979 | Burba et al. | |
| 4,266,578 A | 5/1981 | Swain et al. | |
| 4,304,883 A | 12/1981 | Fujii et al. | |
| 4,445,688 A | 5/1984 | Frillici et al. | |
| 4,543,998 A | 10/1985 | Thomerson | |
| 4,557,977 A | 12/1985 | Memmer et al. | |
| 4,884,451 A | 12/1989 | Schulze | |
| 5,059,640 A | 10/1991 | Hegedus et al. | |
| 5,110,621 A * | 5/1992 | Sudo et al. | 427/503 |
| 5,204,387 A | 4/1993 | Matsuzaki et al. | |
| 5,470,912 A | 11/1995 | Loar | |
| 5,673,721 A | 10/1997 | Alcocer | |
| 5,817,365 A | 10/1998 | Richardson et al. | |

(Continued)

FOREIGN PATENT DOCUMENTS

| | | |
|---|---|---|
| EP | 0943782 A2 | 9/1999 |
| JP | 2008019332 A | 1/2008 |

(Continued)

OTHER PUBLICATIONS

Wang et al, J. of Supercritical Fluids, 28, pp. 85-99, 2004.*

(Continued)

*Primary Examiner* — Erma Cameron
(74) *Attorney, Agent, or Firm* — TraskBritt

(57) ABSTRACT

A method for forming a protective coat upon an article includes forming a liquid coating mixture comprising a cross-linking agent and a polymer dissolved within a solvent; applying a first coat of the coating mixture upon the article; evaporating the solvent from the first coat; and cross-linking the article. Also disclosed is a device containing an exterior surface at least partially covered by a coating comprising a cross-linked polymer and a filler material that is selected from the group consisting of a fullerene, a micro-encapsulated material, and a combination of two or more thereof.

17 Claims, 4 Drawing Sheets

U.S. PATENT DOCUMENTS

| | | | |
|---|---|---|---|
| 6,021,524 | A | 2/2000 | Wu et al. |
| 6,045,873 | A | 4/2000 | Adachi et al. |
| 6,100,361 | A | 8/2000 | Keller |
| 6,131,658 | A | 10/2000 | Minear |
| 6,283,208 | B1 | 9/2001 | George et al. |
| 6,569,375 | B1 | 5/2003 | McGlothlin et al. |
| 6,775,848 | B2 | 8/2004 | McGlothlin et al. |
| 6,825,659 | B2 | 11/2004 | Prammer et al. |
| 6,920,643 | B2 | 7/2005 | McGlothlin et al. |
| 7,442,205 | B2 * | 10/2008 | Verhoeven et al. ......... 623/1.46 |
| 2003/0144400 | A1 | 7/2003 | Osen et al. |
| 2005/0022631 | A1 | 2/2005 | Brazil |
| 2007/0299402 | A1 * | 12/2007 | Ishii et al. ............... 604/164.13 |
| 2008/0251247 | A1 | 10/2008 | Flint et al. |
| 2008/0296024 | A1 | 12/2008 | Huang et al. |
| 2009/0036605 | A1 | 2/2009 | Ver Meer |
| 2010/0101780 | A1 | 4/2010 | Ballew et al. |

FOREIGN PATENT DOCUMENTS

| | | |
|---|---|---|
| KR | 100816551 B1 | 4/2008 |
| RU | 2186187 C1 | 7/2002 |
| RU | 2209911 C1 | 8/2003 |
| WO | 0177210 A2 | 10/2001 |
| WO | 2011067574 A1 | 6/2011 |

OTHER PUBLICATIONS

Voorn et al, Macromol. Symp., 245-246, pp. 584-590, 2006.*
Drilling Accessories, Sampling Collector: Cyclone Style RC, www.drillingsupplystore.com, retrieved Jun. 13, 2011, 3 pages.
Latex 2001 Conference Proceedings (excerpts), The Latex Industry in Transformation, Organized by Rapra Technology, Ltd., Dec. 4-5, 2001, Germany, 6 pages.
Splash Zone Protection, Pipe Coating, Machining & Fabrication, www.marktool.com, retrieved Jun. 13, 2011, 2 pages.
Performix Brand, Plasti Dip, Multi-Purpose Rubber Coating, Plasti Dip International, Blaine, MN, Technical Data Sheet #5, Revised Feb. 25, 2009, 2 pages.
QCM Industrials, Manufacturer of Industrial Vinyl Plastisol, Quality Controlled Manufacturing, Kent, WA, www.qcminds.com/index.php, retrieved Jun. 16, 2011, 266 pages.
RubiChem Inc., Formulated Coatings Division, Rubber-Dip, High Solids Rubber Anti-Tack Compound, http://rubichem.com/rubber-dip, retrieved Jun. 16, 2011, 1 page.
International Search Report for International Application PCT/US2012/045738 dated Jan. 30, 2013, 3 pages.
International Written Opinion for International Application PCT/US2012/045738 dated Jan. 30, 2013, 5 pages.

* cited by examiner

METHODS OF FORMING PROTECTING COATINGS ON SUBSTRATE SURFACES

FIELD

Embodiments of the present disclosure relate to methods used to provide a protective coating on an article of manufacture and to articles of manufacture including such protective coatings.

BACKGROUND

Many articles used in industry are exposed to harsh environments or are used in such a manner that the articles are brought into forced contact with other objects and materials. For example, tools used in a wellbore or other downhole environment in the drilling industry are often exposed to earthen formation materials, interactions with other downhole tools and components, solids-laden fluids, corrosive fluids, temperatures ranging to and beyond 150° C., and pressures ranging up to about 30,000 psi. These environments and encounters may lead to abrasion, corrosion, erosion, or other wear and resulting degradation of the surface and bulk material of the article. Where such articles are tools or industrial components, such as downhole tools and components, even minor damage to the surface of the article may cause disruption and delay to the system and/or process in which the article is used and may necessitate repairs or replacements.

Some articles comprise multiple layers of materials disposed over a substrate. For example, an article may comprise a metal layer applied to the exterior surface of an inner component to protect the inner component. Degradation of the exterior metal layer may result in the need to repair or replace the metal layer.

Various compositions and methods have been utilized to apply polymer-comprising coatings to the exterior surfaces of articles to provide protection to the articles. These compositions and methods vary greatly in substance and complexity. Examples of such compositions and/or methods are disclosed in, for example, U.S. Pat. No. 6,775,848, which issued Aug. 17, 2004, to McGlothlin et al.; U.S. Pat. No. 5,059,640, which issued Oct. 22, 1991, to Hegedus et al.; U.S. Pat. No. 4,557, 977, which issued Dec. 10, 1985, to Memmer et al.; U.S. Pat. No. 3,340,222, which issued Sep. 5, 1967, to Fang; and U.S. Pat. No. 3,324,069, which issued Jun. 6, 1967, to Koblitz et al., each of which is incorporated herein in its entirety by this reference.

BRIEF SUMMARY

In some embodiments, the present disclosure includes a method for forming a protective coat upon an article in which the method includes forming a liquid coating mixture to comprise a cross-linking agent and a polymer dissolved within a solvent. The method further includes applying a coat upon the article, evaporating solvent from the formed coat, and cross-linking the polymer.

In some embodiments, the present disclosure includes a method for forming a protective coat upon an article in which the method includes forming a first mixture to comprise a cross-linking agent and an organic solvent. A liquid coating mixture is formed by dissolving a polymer within the first mixture. The method further includes applying a first coat of the coating mixture upon the article, evaporating the solvent from the first coat, applying a second coat of the coating mixture upon the first coat, evaporating the solvent from the second coat, and cross-linking the polymer.

In some embodiments, the present disclosure includes a downhole tool having an exterior surface at least partially covered by a coating comprising a cross-linked polymer and a filler material selected from the group consisting of a fullerene, a micro-encapsulated material, and a combination of two or more thereof.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

Figure 1:
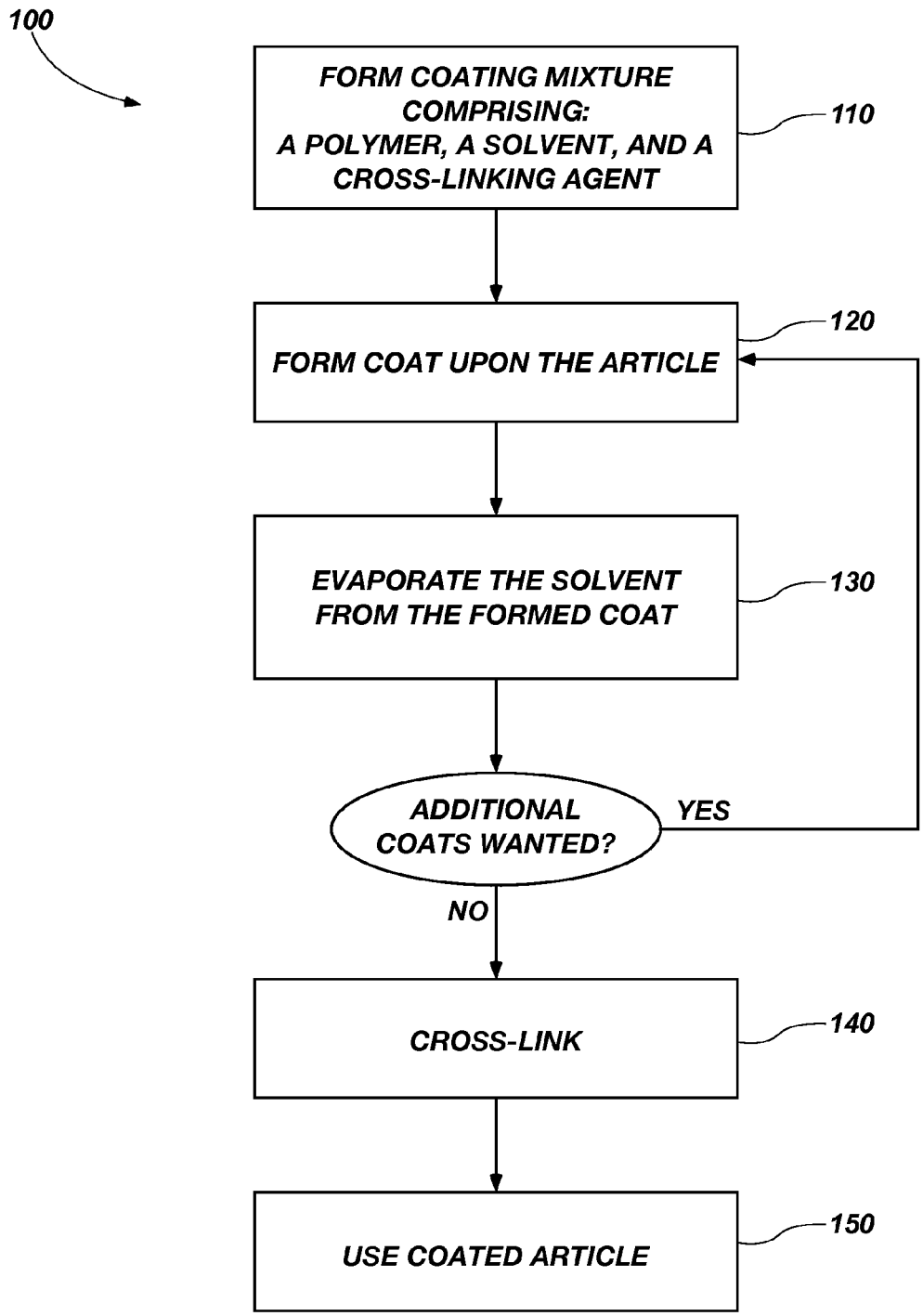
FIG. 1 is a flowchart of a method of the present disclosure for forming a protective coat upon an article.

The illustrations presented herein are not actual views of any particular article or method but are merely idealized representations that are employed to describe embodiments of the present disclosure.

As used herein, the term "article" means a tangible object. Articles contemplated herein include, without limitation, downhole tools, bellows, seals, hoses, bumpers, gaskets, caps, grommets, diaphragms, plugs, shock mounts, hand tools, components thereof, and the like.

As used herein, the term "downhole tool" means and includes any article, tool or component used within a wellbore in a subterranean formation. Downhole tools include, without limitation, tools and components used in testing, surveying, drilling, enlarging, completing, sampling, monitoring, utilizing, maintaining, repairing, etc., a wellbore.

As used herein, the term "wellbore" means a man-made conduit formed in a subterranean formation for various purposes including, for example, extraction of oil and gas from the subterranean formation and extraction of geothermal heat from the subterranean formation.

As used herein, the term "cross-linking" means linking of polymer chains to promote a change in the polymer's physical properties. Cross-linking is also known in the art as "curing" and includes, without limitation, cross-linking by chemical reaction, radiation exposure, electron beam exposure, gamma-radiation, ultra violet (UV) light exposure, and vulcanization.

As used herein, the term "cross-linked polymer" means a polymer comprising bonds linking one polymer chain to another as a result of cross-linking.

As used herein, the term "cross-linkable polymer" means a polymer comprising polymer chains capable of bonding to another polymer chain, either directly or indirectly, as a result of cross-linking.

As used herein, the term "cross-linking agent" means a chemical formulated to interact with a cross-linkable polymer or partially cross-linked polymer so as to promote cross-linking of the polymer, whether or not the cross-linking occurs upon mixing of the cross-linking agent with the polymer or only upon subjecting the mixture to additional cross-linking processes or energy forms, such as those mentioned above. Cross-linking agents include, without limitation, organic peroxides, sulfur-comprising compounds, selenium-comprising compounds, and tellurium-comprising compounds. Cross-linking agents further include, without limitation, diacyl peroxides, peroxyketals, dialkyl peroxides, mercaptothiazoles, thiuram sulfides, thiuram disulfides, guanidines, zinc dialkyl dithiocarbamates, selenium dialkyl dithiocarbamates, sodium diethyldithiocarbamates, potassium diethyldithiocarbamates, alkyl phenol sulfides, sulfur-comprising polymers, and benzothiazyl disulfides.

As used herein, the term "vulcanize" means a chemical process of treating a cross-linkable polymer that results in cross-links between individual polymer chains. Vulcanizing includes, without limitation, cross-linking utilizing a cross-linking agent such as sulfur, a peroxide, a urethane, a metallic oxide, selenium, tellurium, compounds thereof, combinations thereof, and the like.

As used herein, the term "fullerene" means a carbon-based molecule in which the carbon atoms are arranged in pentagonal and/or hexagonal shapes. Fullerenes exist in many different configurations including, for example, planar sheets (e.g., graphene), nanotubes (e.g., "buckytubes," as they are sometimes referred to in the art), spheroids (e.g., "buckyballs," as they are sometimes referred to in the art), nanobuds, megatubes, polymers, nano-"onions," linked "ball-and-chain" dimers, and rings.

As used herein, the term "micro-encapsulated material" means a material comprising microcapsules having a core, internal phase, or fill comprising a first material and a shell, coating, or membrane comprising a second material, the micro-encapsulated material being configured to release the first material encapsulated within the core upon rupture of the shell.

As used herein, the term "liquid" means and includes a pourable or otherwise substantially flowable material, and without regard to a specific viscosity, or proportions of constituents of the material. For example, a liquid, as the term is used herein, may include particulate or other non-dissolved material in suspension.

In some embodiments, the disclosure includes a method for forming a protective coat upon an article. A polymer, a solvent, and a cross-linking agent are used to form a liquid coating mixture, which is used to apply at least one coat upon the article. The solvent is evaporated from the coat. The coated article is subjected to a cross-linking process, during which the cross-linking agent, which was included in the coating mixture, is utilized. The cross-linked coating provides protection to the underlying article during subsequent use of the coated article.

FIG. 1 sets forth a flowchart of an embodiment of a method for forming a protective coating upon an article. The method of FIG. 1 includes forming a liquid coating mixture comprising a polymer, a solvent, and a cross-linking agent 110, the polymer of which is dissolved within the solvent. The polymer within the coating mixture may be, without limitation, an elastomer or a thermoplastic. The polymer may be natural rubber (NR), acrylonitrile-butadiene rubber (NBR), hydrogenated acrylonitrile-butadiene rubber (HNBR), ethylene propylene diene rubber (EPDM), fluorocarbon rubber (FKM), chloroprene rubber (CR), silicone rubber (VMQ), fluorosilicone rubber (FVMQ), polyacrylate rubber (ACM), ethylene acrylic rubber (AEM), styrene-butadiene rubber (SBR), polyester urethane (AU), polyether urethane (EU), a co-polymer thereof, a polymer blend thereof, or a combination thereof. The polymer may be a polyisocyanate, a polyurethane, a polyester, a polyethylene, an ultra-high-molecular-weight polyethylene, a polybutylene, a polypropylene, a plastisol, a polyacrylic, a polyether ketone, a polyphenyl sulfone, a polyvinyl, a polyvinylidene, a silicone, a polyisoprene, an epoxy, a polychloroprene, a polyether imide, a polybenzimidazole, a polycarbonate, a polycarbonate/acetonitrile-butadiene-styrene alloy, a fluoropolymer, an ionomer resin, a polyamide, a polyimide, a polyamide-imide, a vinyl acetate, a co-polymer thereof, a polymer blend thereof, or a combination thereof. Selecting a particular polymer or combination of polymers to include in the coating mixture may be a selection made to accommodate the intended use for the coated article or to accommodate the desired property of the coated article. For example, a polymer having a high melting point may be selected for a coating mixture that will coat an article to be used in a high-temperature environment. As another example, a polymer having a high electric resistivity may be selected for a coating mixture that will coat an article to be used in an electrically-sensitive system.

The solvent within the coating mixture may be an organic solvent. The solvent may be tetrachloroethylene, turpentine, hexane, petroleum ether, acetone, methyl ethyl ketone, methyl isobutyl ketone, diisobutyl ketone, toluene, xylene, d-limonene, methyl acetate, ethyl acetate, n-butyl acetate, isobutyl acetate, ethanol, propanol, butanol, or a combination thereof. Selection of a particular organic solvent or a combination thereof to include in the coating mixture may be a selection configured to accommodate the dissolution of the chosen polymer within the organic solvent.

The cross-linking agent within the coating mixture may be an organic peroxide, a sulfur-comprising compound, a selenium-comprising compound, a tellurium-comprising compound, or a combination thereof. The cross-linking agent may be one or more of diacyl peroxides, peroxyketals, dialkyl peroxides, mercaptothiazoles, thiuram sulfides, thiuram disulfides, guanidines, zinc dialkyl dithiocarbamates, selenium dialkyl dithiocarbamates, sodium diethyldithiocarbamates, potassium diethyldithiocarbamates, alkyl phenol sulfides, sulfur-comprising polymers, and benzothiazyl disulfides. The cross-linking agent may be a vulcanizing agent. Such a cross-linking agent may be configured to accommodate vulcanization. Selection of a particular cross-linking agent or a combination thereof to include in the coating mixture may be a selection configured to accommodate the cross-linking of the chosen polymer.

In further regard to FIG. 1, the method of forming a protective coat upon an article 100 further includes forming a coat upon the article 120 as by applying the liquid coating material upon the article. A first coat may be applied by dipping the article within a batch of the coating mixture. A first coat may alternatively be applied by molding the coating material to the article, by spraying the coating mixture upon the surface of the article, or by other conventional coat-application methods.

The coating method 100 further includes evaporating solvent from the formed coat 130. Evaporation of the solvent may occur passively, by simply allowing the coat to "dry," or actively, by "driving out" the solvent from the coat. Evaporation of the solvent may occur in an environment at a temperature in the range between and including 15° C. and 25° C. or at an elevated temperature up to, but not exceeding, 150° C. It is contemplated that nearly all, e.g., more than 90%, of the solvent comprised within the coat will be evaporated from the coat in this process. It is further contemplated that evaporating the solvent from the formed coat 130 will occur over a time period of one-half hour to two hours. In some aspects of the method, evaporating solvent from the formed coat 130 may include subsequent sessions of evaporation at room temperature (i.e., temperatures in the range between 15° C. and 25° C., inclusive) and at warm temperature (i.e., temperatures up to, but not exceeding, 150° C.).

Additional coats, if wanted, may be applied on top of one or more already-applied coats. Therefore, if a single coat does not provide a protective coating of a sufficient thickness, the process of forming a coat upon the article 120 may be repeated. After forming a subsequent coat, solvent from the subsequent coat is allowed or forced to evaporate in accordance with the means used for evaporating the solvent from the first coat 130. Again, this evaporation of solvent from the subsequent coat 130 may occur at room temperature and/or at a warm temperature.

Following this forming of a subsequent coat, if still additional coating is desired, the multiple-coated article may be subjected to forming yet an additional coat upon the article 120 and evaporating the solvent from the formed additional coat 130. This may continue until the accumulation of coatings applied to the article is of satisfactory thickness. In some aspects of the method, the viscosity and/or composition of the coating mixture may be adjusted between coat applications.

With continued reference to FIG. 1, the method for forming a protective coat upon an article 100 further includes cross-linking 140. It is contemplated that cross-linking 140 will be performed following coating of the article with the desired number of coats of the coating mixture. During cross-linking 140, the cross-linking agent or agents comprised within the coating mixture, formed upon the article during formation of coats, will be utilized. Cross-linking 140 may occur immediately after completion of the formation of coating layers 130. It is contemplated that cross-linking may be conducted in a high-temperature environment in which temperatures exceed 150° C. The chosen cross-linking temperature may be appropriate for the effective cross-linking of the chosen polymer material and chosen cross-linking agent or agents. Cross-linking 140 may be carried out for one-half hour to two hours, e.g., one hour.

The method for forming the protective coat upon an article 100 may further include a post-cure process in which the cross-linked article is subjected to a very high temperature, i.e., a temperature exceeding that used for the cross-linking 140 process. Subsequently, the article having a protective coat may be cooled to room temperature and used in accordance with its normal purpose 150.

Figure 2:
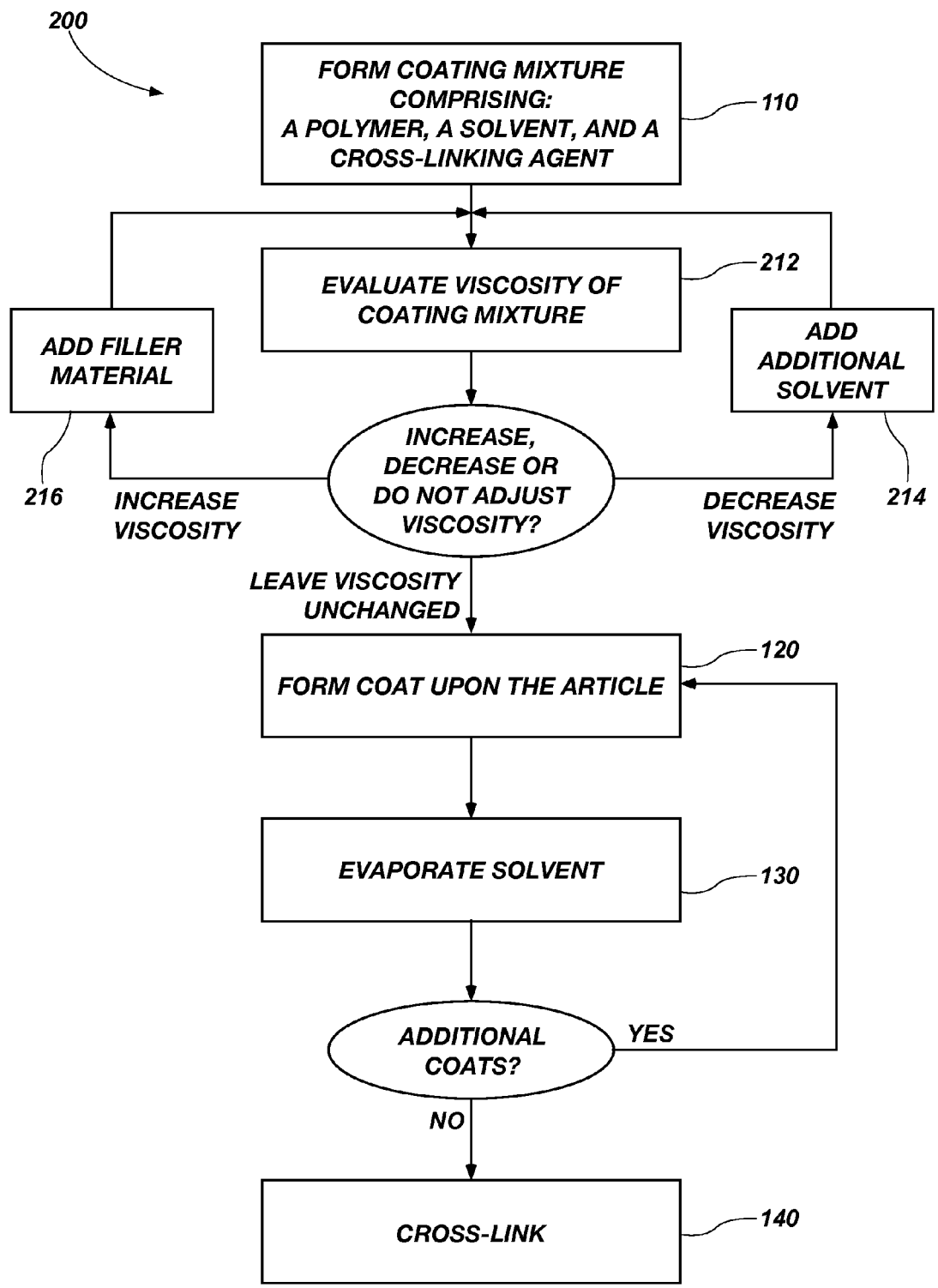
FIG. 2 is a flowchart of a method of the present disclosure for forming a protective coat upon an article, the method including evaluating and addressing a viscosity of the coating mixture.

With reference to FIG. 2, another embodiment of the method for forming a protective coat upon an article 200 includes evaluating and adjusting, if desired, the viscosity of the coating mixture. In such an embodiment, following forming of the liquid coating mixture comprising the polymer, the solvent, and the cross-linking agent 110, the viscosity of the coating mixture is evaluated 212. If the viscosity of the coating mixture is found to be higher than desired, additional solvent may be added to the coating mixture 214. It is contemplated that the evaluated viscosity of the coating mixture, in this instance, will be greater than the viscosity of the solvent to be added. Therefore, adding additional solvent to the originally-formed liquid coating mixture will decrease the overall viscosity of the mixture.

If, upon evaluating the viscosity of the coating mixture 212, it is found that the viscosity of the coating mixture is less than desired, a filler material may be added to the coating mixture 216. This addition of a filler material to the lower-viscosity coating mixture will therefore increase the overall viscosity of the filler-added coating mixture. The filler material added to the coating mixture may comprise a fullerene. The added fullerene may be graphene, carbon nanotubes, or the like. Such a coating mixture therefore includes a polymer, a solvent, a cross-linking agent, and a filler material comprising fullerene.

Following the addition of a filler material to increase viscosity 216 or additional solvent to lower viscosity 214, the viscosity of the added-to coating mixture may be reevaluated 212 and additional adjustments to the viscosity made until the viscosity of the mixture is as desired. The viscosity of the coating mixture may be that which is appropriate to accommodate adherence of the coating mixture to the article in a thickness appropriate for the wanted protective coating. Accordingly, when applying the coating mixture to an article to be protected with a thin coating, a lower viscosity liquid coating mixture may be appropriate. Alternatively, when applying the coating mixture to an article to be protected with a thick coating, a higher viscosity liquid coating mixture may be appropriate.

In continued reference to FIG. 2, as with the first embodiment, the second embodiment of the method for forming a protective coat upon an article 200 also includes forming a coat upon the article 120 as by applying the coating material to the article. This may involve dipping the article within the liquid coating mixture. It further includes evaporation of solvent from the coat on the article 130, possible forming of additional coats, and cross-linking of the article 140. Thereafter, the article having a protective coat may be cooled to a usable temperature and used in accordance with its normal practice 150.

Figure 3:
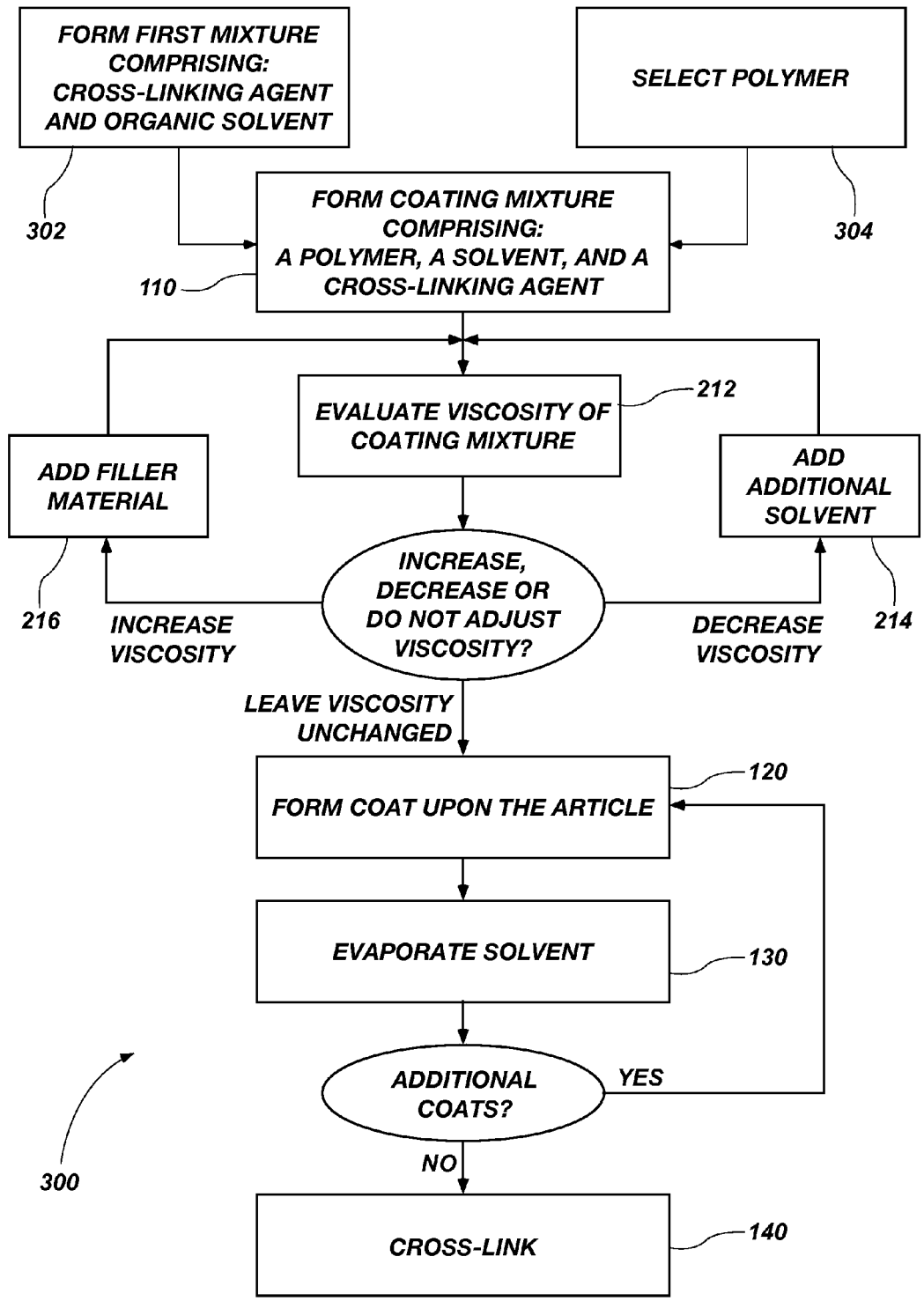
FIG. 3 is a flowchart of a method of the present disclosure for forming a protective coat upon an article, the method including forming a coating mixture from a selected polymer and a first mixture comprising a cross-linking agent and an organic solvent.

With reference to FIG. 3, another embodiment of a method for forming a protective coat upon an article 300 includes forming a first mixture to comprise a cross-linking agent and an organic solvent 302. It further includes selecting a polymer 304 and, using the first mixture and the selected polymer, dissolving the selected polymer within the first mixture to form a coating mixture to comprise the polymer, the solvent, and the cross-linking agent 110. This coating mixture may thereafter be utilized in the method 300 as that of either the first embodiment of the method 100 or the second embodiment of the method 200. In addition, when, in accordance with the second embodiment of the method 200, the viscosity of the originally-formed, liquid coating mixture is to be decreased, a second amount of the lower-viscosity first mixture may be added, rather than only solvent, to the originally-formed coating mixture so as to lower the viscosity of the mixture.

In accordance with the third embodiment, the method 300 may also include adding an additional amount of the cross-linking agent, which was included within the first mixture 302, to the selected polymer 304 prior to forming the coating mixture 110. For example, where a polymer-and-cross-linking-agent-comprising compound is needed for use in multiple settings, the compound may be prepared for the multiple uses prior to including a solvent in accordance with the present methods 100, 200, 300. For example, if a compound comprising an elastomer and a cross-linking agent is needed for molding a second article in an injection molding process and is also needed for inclusion in a coating mixture according to the present method, the elastomer polymer and cross-linking agent may be incorporated into a polymer-agent mixture and only a portion of that mixture used to mix with the first mixture of the present method 300 to form the coating mixture 110. The remaining amount of the polymer-agent mixture may then be used in the separate injection molding process.

The present methods 100, 200, 300 may further include adding one or more filler materials. Such filler materials may include carbon black, a silica, a silicate, calcium carbonate, magnesium carbonate, kaolin, dolomite, chalk, feldspar, mica, barium sulfate, a lubricant, or a combination thereof. The filler material may alternatively or additionally be one or more fullerenes including those structured as planar sheets (e.g., graphene), nanotubes (e.g., buckytubes), spheroids (e.g., buckyballs), nanobuds, megatubes, polymers, nano-onions, linked ball-and-chain dimers, and rings. In some embodiments, the filler material may comprise, alternatively or additionally, metal particles, including metal particles on a micrometer or nanometer scale. These metal particles may be coated or uncoated. For example, where the article to be coated is one that is to be used in a harsh environment, silicate-coated aluminum flakes may be included as a filler material within the coating mixture such that the resulting protective coating is configured to protect against corrosion. The filler material may, alternatively or additionally, be one or more micro-encapsulated materials, such as a micro-encapsulated lubricant. Such micro-encapsulated material may allow inclusion of a substance within the coating mixture that, without encapsulation, might otherwise interfere with the polymer and/or the cross-linking agent within the coating mixture. For example, where the article to be coated is one that is to interact with a counterpart article, graphite lubricant material may be micro-encapsulated prior to inclusion of the micro-encapsulated graphite within the coating mixture. Following coating of the article and cross-linking thereof, interaction of the coated article with its counterpart article will mechanically release the encapsulated graphite and provide the graphite lubricant without risking undesirable interaction of the graphite lubricant material with the properties of the polymer within the coating mixture.

The present methods 100, 200, 300 may also include adding accelerators in the liquid coating mixture. Accelerators are chemicals or other materials that accommodate or catalyze the cross-linking process. Accelerators that may be included within the coating mixture may include, without limitation, stannous octoate, dibutyl tin dilaurate, dibutyl tin diacetate, and the like. Selection of an accelerator should be configured to accommodate cross-linking of the selected cross-linking agent and selected polymer.

The present methods 100, 200, 300 may still further include adding curing agents to the coating mixture. Curing agents may include, without limitation, aromatic amines, acid anhydrides, guanidine compounds, dicyandiamide, imidazole compounds, or combinations thereof.

The present methods 100, 200, 300 may also include adding other "additive" materials within the liquid coating mixture, such as, without limitation, inhibitors, processing acids, stabilizers, surfactants, defoamers, and the like. Stabilizers may include antioxidants, hindered amine light stabilizers, polyamides, benzophenones, benzotriazoles, hydroxyphenyl-triazines, antiozonants, and organosulfur compounds.

Adding such additive materials (i.e., the fillers, accelerators, curing agents, inhibitors, processing assets, stabilizers, surfactants, defoamers, and the like), in whatever combination or amount, to the coating mixture may be performed during the forming of the liquid coating mixture to comprise the cross-linking agent and the polymer dissolved within the solvent 110. Alternatively, adding the additive materials may be accomplished following evaluation of the viscosity of the coating mixture 212, concurrently with or subsequently to the addition of solvent to decrease viscosity 214, and/or concurrently with or subsequently to the addition of filler material to increase viscosity 216. As another alternative, adding the additive materials may be performed with the forming of the first mixture to comprise the cross-linking agent and organic solvent 302 and/or with the polymer at the selection of the polymer 304, prior to joining the first mixture and the selected polymer to form a coating mixture comprising the polymer, the solvent, and the cross-linking agent 110 (FIG. 3).

In other embodiments, the method for forming a protective coat upon an article may also include a pre-treatment process. Prior to the forming a first coat of the liquid coating mixture upon the article, the exterior surface of the article may be pre-treated so as to encourage or enhance adhesion of the coating mixture to the surface of the article. For example, articles having a polymer-comprising exterior surface or metal surface may be pre-treated using a plasma activation process. Etching methods may be used such as those involving chromic acid or hydrofluoric acid. Dry ice treatment or sandblasting may alternatively or additionally be used. The surface may alternatively or additionally be cleaned to remove contaminants prior to coating. These pre-treatment processes may be carried out at atmospheric pressure, at high pressure, or in a vacuum. Articles comprising metal exterior surfaces may be exposed to temperatures at or exceeding 400° C. to encourage cracking of hydrocarbon contaminants on the surface of the article. Articles comprising metal substrates may also be subjected to peeling or blasting to roughen the exterior surface prior to coating.

Accordingly, the present methods for forming a protective coat upon an article 100, 200, 300 allow for a great deal of flexibility in preparing and adjusting the coating mixture and application process so as to accommodate the intended purpose of the article and the desired properties of the protective coating. In particular, the option of including fullerenes and micro-encapsulated material, in either or both of the forming of the first mixture comprising the cross-linking agent and the organic solvent 302 and the forming of the coating mixture comprising the polymer, the solvent, and the cross-linking agent 110, provides a broad range of options for the composition of the coating material. For example, to coat an article with an abrasion-resistant, protective coating, the third embodiment of the present method 300 may be utilized with fullerene nanoparticles included in forming the first mixture 302 and/or included with the selected polymer 304. The included fullerenes may provide additional strength and stability to the resulting cross-linked protective coating. As another example, to coat an article with a corrosion-resistant, protective coating, the third embodiment of the present method 300 may be utilized with micro-encapsulated graphite lubricant included in forming the first mixture 302 and/or included with the selected polymer 304. The included micro-encapsulated graphite lubricant may provide additional protection against surface-to-surface wear to the resulting cross-linked protective coating. As still another example, to coat an article with an electrically-resistant, protective coating, the first or second embodiments of the present methods 100, 200 may be utilized with an electrically-resistant polymer and with an electrically-resistant filler material included in forming the coating mixture 110.

Figure 4:
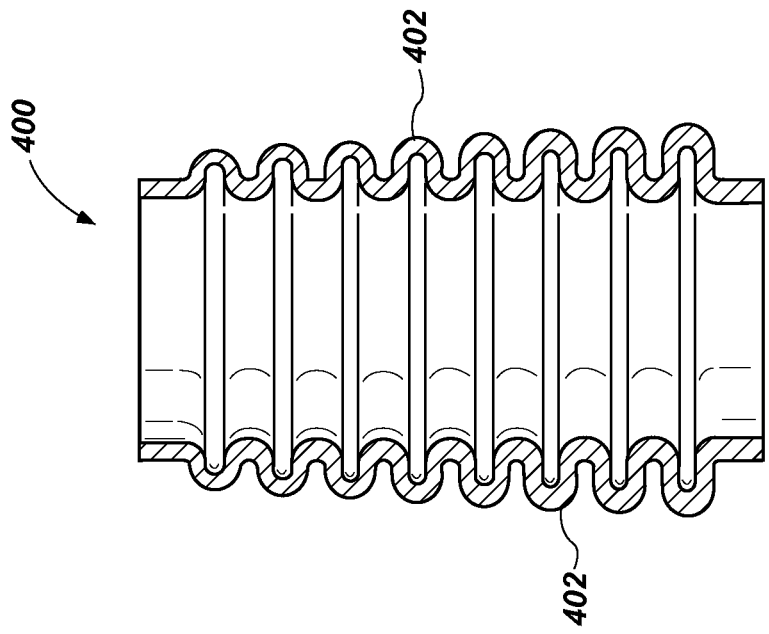
FIG. 4 is a cross-sectional, elevation view of a downhole tool to be coated.

With regard to FIG. 4, depicted is an example of a downhole tool to be coated, namely a conventional rubber bellows 400 having an exterior surface 402. The rubber bellows 400 may be intended for use in a harsh, downhole environment, such as within a subterranean wellbore at high pressures and temperatures. According to one example embodiment of the present method, a liquid coating mixture comprising at least 15% by weight, e.g., nearly 20% by weight, fluorocarbon rubber (FKM) is dissolved within a first amount of methyl ethyl ketone (MEK) solvent such that the MEK comprises at least 75% by weight, e.g., nearly 80% by weight, of the mixture, the remaining amount of the mixture comprising a sulfur-based cross-linking agent. Additional amounts of MEK solvent may be added to the coating mixture, if necessary, to achieve a desired viscosity of the liquid mixture below 1000 mPa·s. Thereafter, at atmospheric pressure and at temperatures in a range between and including 15° C. and 25° C., at least the exterior surface 402 of the rubber bellows 400 is dipped within the liquid coating mixture. Upon withdrawing the rubber bellows 400 from the liquid coating mixture, the rubber bellows 400 is slowly rotated so as to encourage even displacement of the coating mixture upon the exterior surface 402 of the rubber bellows 400. The result of this process is a rubber bellows 400 (or, in other embodiments, a downhole tool or other article) having a coating at least partially covering an exterior surface where the coating comprises a polymer, a solvent, and a cross-linking agent. In embodiments in which filler materials or other additives were included in the coating mixture, the coating may also comprise a fullerene, a micro-encapsulated material, or a combination thereof.

The single-coated rubber bellows 400 is then subjected to temperatures at or near 80° C. for a period of about one hour during which solvent from the first coat is driven out from the coated layer. Thereafter, the single-coated rubber bellows 400 is dipped again within the liquid coating mixture, removed from the mixture, rotated to encourage even displacements of the mixture, and again subjected to a temperature at or near 80° C. for approximately one-half hour to one hour, to again drive solvent from the second coat. Once essentially all of the solvent from the applied coating mixture has evaporated, leaving an essentially-uniform layer of an essentially-solvent-free mixture comprising a cross-linkable polymer and cross-linking agent upon the rubber bellows 400, the twice-coated rubber bellows 400 is then subjected to temperatures at or near 170° C., during which the sulfur-comprising cross-linking agent reacts with the fluorocarbon rubber polymer to vulcanize the polymer, thereby cross-linking the coated rubber bellows 400.

According to another example embodiment of the present methods for forming a protective coating upon an article 100, 200, 300, a first mixture is formed 302 comprising 45% by volume peroxide cross-linking agent in methyl ethyl ketone. A second mixture is formed comprising 75% by volume coagent in methyl ethyl ketone. A polymer is selected 304 to be an FKM polymer. A coating mixture is formed 110 by dissolving the selected FKM polymer within a combination of the first and second mixtures. Filler materials of zinc oxide and carbon black are added to the coating mixture. The resulting liquid coating mixture comprises approximately 1% by weight FKM polymer, 40% by weight of the first mixture (containing 45% concentrated peroxide), 30% by weight of the second mixture (containing 75% concentrated coagent), 24% by weight zinc oxide filler, and 4% by weight carbon black filler. Either before or after evaluating the viscosity of the coating mixture 212, additional methyl ethyl ketone is added, if necessary, to form a liquid coating mixture comprising 80% by weight methyl ethyl ketone.

According to an example embodiment of the present method, the liquid coating mixture of the preceding example is formed and a graphene filler material is added to form a liquid coating mixture comprising an FKM latex dispersion with 2.5 grams per liter graphene and peroxide curing agent. This FKM latex dispersion is applied to the exterior surface of an article comprising a peroxide cure FKM elastomer substrate. The resulting protective coating on the article may provide 25% better resistance to the permeation of carbon dioxide at 85° C. compared to the same article without protective coating.

Figure 5:
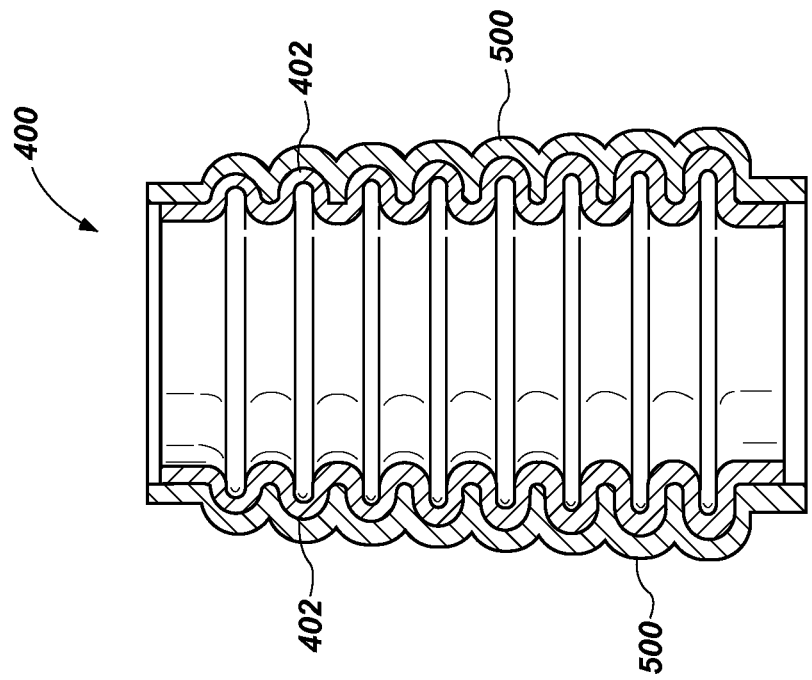
FIG. 5 is a cross-sectional, elevation view of the downhole tool of FIG. 4, with a coating covering an exterior surface of the tool.

With regard to FIG. 5, depicted is a protectively-coated rubber bellows 400, comprising a protective coat 500 of cross-linked fluorocarbon rubber covering the exterior surface 402 of the rubber bellows 400. The protectively-coated rubber bellows 400 may thereafter be used in accordance with its normal use, such as within a downhole environment. (It should be noted that in accordance with some embodiments, FIG. 5 is also a depiction of a coated downhole tool prior to evaporation of solvent from the formed coat 130 and prior to cross-linking 140.)

Though the example article depicted in FIGS. 4 and 5 comprises a rubber substrate, the present method is not limited to use with rubber-surfaced articles. Metal articles, other polymer articles, and articles comprising prior layers or coatings of metal, polymer, or other materials may be protected utilizing the present method.

Additional non-limiting example embodiments of the disclosure are described below.

Embodiment 1: A method for forming a protective coat upon an article, comprising forming a liquid coating mixture to comprise a cross-linking agent and a polymer dissolved within a solvent; applying a first coat of the coating mixture upon the article; evaporating the solvent from the first coat; and cross-linking the polymer; wherein evaporating the solvent from the first coat precedes cross-linking the polymer of the first coat.

Embodiment 2: The method of Embodiment 1, further comprising forming a second coat of the coating mixture upon the first coat; and evaporating the solvent from the second coat; wherein evaporating the solvent from the second coat precedes cross-linking the polymer of the second coat.

Embodiment 3: The method of any of Embodiments 1 and 2, further comprising increasing a viscosity of the coating mixture by adding a fullerene to the coating mixture.

Embodiment 4: The method of any of Embodiments 1 through 3, further comprising decreasing the viscosity of the coating mixture by adding a second amount of the solvent to the coating mixture.

Embodiment 5: The method of any of Embodiments 1 through 4, wherein forming the liquid coating mixture to comprise the cross-linking agent and the polymer dissolved within the solvent further comprises selecting the polymer from the group consisting of natural rubber, acrylonitrile-butadiene rubber, hydrogenated acrylonitrile-butadiene rubber, ethylene propylene diene rubber, fluorocarbon rubber, chloroprene rubber, silicone rubber, fluorosilicone rubber, polyacrylate rubber, ethylene acrylic rubber, styrene-butadiene rubber, polyester urethane, polyether urethane, a co-polymer thereof, a polymer blend thereof, and combinations thereof.

Embodiment 6: The method of any of Embodiments 1 through 5, wherein forming the liquid coating mixture to comprise the cross-linking agent and the polymer dissolved within the solvent further comprises selecting the solvent from the group consisting of tetrachloroethylene, turpentine, hexane, petroleum ether, acetone, methyl ethyl ketone, methyl isobutyl ketone, diisobutyl ketone, toluene, xylene, d-limonene, methyl acetate, ethyl acetate, n-butyl acetate, isobutyl acetate, ethanol, propanol, butanol, and combinations thereof.

Embodiment 7: The method of any of Embodiments 1 through 6, wherein forming the liquid coating mixture to comprise the cross-linking agent and the polymer dissolved within the solvent further comprises selecting the cross-linking agent from the group consisting of organic peroxides, sulfur-comprising compounds, selenium-comprising compounds, and tellurium-comprising compounds.

Embodiment 8: The method of any of Embodiments 1 through 7, wherein forming the liquid coating mixture to comprise the cross-linking agent and the polymer dissolved within the solvent further comprises adding a filler material selected from the group consisting of carbon black, a silica, a silicate, calcium carbonate, magnesium carbonate, kaolin, dolomite, chalk, feldspar, mica, barium sulfate, a lubricant, and a combinations thereof.

Embodiment 9: The method of any of Embodiments 1 through 8, wherein forming the liquid coating mixture to comprise the cross-linking agent and the polymer dissolved within the solvent further comprises adding a micro-encapsulated filler material.

Embodiment 10: The method of any of Embodiments 1 through 9, wherein forming the liquid coating mixture to comprise the cross-linking agent and the polymer dissolved within the solvent further comprises adding a fullerene filler material.

Embodiment 11: A method for forming a protective coat upon an article, comprising forming a first mixture to comprise a cross-linking agent and an organic solvent; forming a liquid coating mixture by dissolving a polymer within the first mixture; applying a first coat of the coating mixture upon the article; evaporating the solvent from the first coat; applying a second coat of the coating mixture upon the first coat on the article; evaporating the solvent from the second coat; and cross-linking the polymer; wherein evaporating the solvent from the first coat precedes applying the second coat of the coating mixture upon the first coat on the article; and wherein evaporating the solvent from the second coat precedes cross-linking the polymer.

Embodiment 12: The method of Embodiment 11, wherein evaporating the solvent from the first coat comprises evaporating the solvent from the first coat at a temperature not exceeding 150° C.

Embodiment 13: The method of any of Embodiments 11 and 12, wherein cross-linking the polymer comprises cross-linking the polymer at a temperature exceeding 150° C.

Embodiment 14: The method of any of Embodiments 11 through 13, wherein forming the first mixture to comprise the cross-linking agent and the organic solvent comprises forming the first mixture to comprise the cross-linking agent, the organic solvent, and a fullerene.

Embodiment 15: The method of any of Embodiments 11 through 14, further comprising increasing a viscosity of the coating mixture by adding a fullerene to the coating mixture.

Embodiment 16: The method of any of Embodiments 11 through 15, further comprising decreasing the viscosity of the coating mixture by adding a second amount of the solvent to the coating mixture.

Embodiment 17: The method of any of Embodiments 11 through 16, further comprising decreasing the viscosity of the coating mixture by adding a second amount of the first mixture to the coating mixture.

Embodiment 18: The method of any of Embodiments 11 through 17, further comprising adding a micro-encapsulated material to the coating mixture.

Embodiment 19: The method of any of Embodiments 11 through 18, wherein forming the first mixture to comprise the cross-linking agent and the organic solvent comprises forming the first mixture to comprise a sulfur-comprising cross-linking agent and methyl ethyl ketone solvent; forming the liquid coating mixture by dissolving the polymer within the first mixture comprises forming the liquid coating mixture by dissolving a fluorocarbon rubber within the first mixture; applying the first coat of the coating mixture upon the article comprises applying the first coat of the coating mixture upon a downhole tool by dipping the downhole tool within the coating mixture; removing the downhole tool from the coating mixture; and rotating the downhole tool to encourage even distribution of the coating mixture upon the downhole tool; evaporating the solvent from the first coat comprises evaporating the methyl ethyl ketone solvent from the first coat at a temperature exceeding 50° C. but not exceeding 100° C.; applying the second coat of the coating mixture upon the first coat on the article comprises applying the second coat of the coating mixture upon the first coat on the downhole tool by dipping the first coat on the downhole tool within the coating mixture; removing the first coat on the downhole tool from the coating mixture; and rotating the downhole tool to encourage even distribution of the coating mixture upon the first coat on the downhole tool; and cross-linking the polymer comprises cross-linking the first coat and the second coat at a temperature exceeding 150° C.; wherein the coating mixture comprises at least 75% by weight methyl ethyl ketone and at least 15% by weight fluorocarbon rubber.

Embodiment 20: The method of any of Embodiments 11 through 19, wherein the article comprises a metal-comprising exterior surface.

Embodiment 21: The method of any of Embodiments 11 through 20, wherein the article comprises an elastomer-comprising exterior surface.

Embodiment 22: A downhole tool comprising an exterior surface and a coating at least partially covering the exterior surface, the coating comprising a cross-linked polymer and a filler material disposed within the cross-linked polymer, the filler material selected from the group consisting of a fullerene, a micro-encapsulated material, and a combination of two or more thereof.

Embodiment 23: The downhole tool of Embodiment 22, wherein the polymer is selected from the group consisting of natural rubber, acrylonitrile-butadiene rubber, hydrogenated acrylonitrile-butadiene rubber, ethylene propylene diene rubber, fluorocarbon rubber, chloroprene rubber, silicone rubber, fluorosilicone rubber, polyacrylate rubber, ethylene acrylic rubber, styrene-butadiene rubber, polyester urethane, polyether urethane, a co-polymer thereof, a polymer blend thereof, and combinations thereof.

Embodiment 24: The downhole tool of any of Embodiments 22 and 23, wherein the coating further comprises a second filler material selected from the group consisting of carbon black, a silica, a silicate, calcium carbonate, magnesium carbonate, kaolin, dolomite, chalk, feldspar, mica, barium sulfate, a lubricant, and combinations thereof.

Embodiment 25: The downhole tool of any of Embodiments 22 through 24, wherein the micro-encapsulated material is a micro-encapsulated graphite lubricant.

Although the foregoing description comprises many specifics, these are not to be construed as limiting the scope of the present invention, but merely as providing certain embodiments. Similarly, other embodiments of the invention may be devised that do not depart from the scope of the present invention. For example, features described herein with reference to one embodiment also may be provided in others of the embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A method for forming a protective coat upon an article, comprising:
    forming a liquid coating mixture to comprise a cross-linking agent and a polymer dissolved within a solvent, comprising:
        forming a first mixture to comprise the cross-linking agent and an organic solvent; and
        dissolving the polymer within the first mixture;
    applying a first coat of the liquid coating mixture upon the article;
    evaporating the solvent from the first coat;
    applying a second coat of the liquid coating mixture upon the first coat on the article;
    evaporating the solvent from the second coat; and
    cross-linking the polymer;
    wherein evaporating the solvent from the first coat precedes applying the second coat and precedes cross-linking the polymer; and
    wherein applying the second coat and evaporating the solvent from the second coat precede cross-linking the polymer.

2. The method of claim 1, further comprising:
    increasing a viscosity of the liquid coating mixture by adding a fullerene to the liquid coating mixture.

3. The method of claim 1, wherein forming the liquid coating mixture to comprise the cross-linking agent and the polymer dissolved within the solvent further comprises selecting the polymer from the group consisting of natural rubber, acrylonitrile-butadiene rubber, hydrogenated acrylonitrile-butadiene rubber, ethylene propylene diene rubber, fluorocarbon rubber, chloroprene rubber, silicone rubber, fluorosilicone rubber, polyacrylate rubber, ethylene acrylic rubber, styrene-butadiene rubber, polyester urethane, polyether urethane, a co-polymer thereof, a polymer blend thereof, and combinations thereof.

4. The method of claim 1, wherein forming the liquid coating mixture to comprise the cross-linking agent and the polymer dissolved within the solvent further comprises selecting the solvent from the group consisting of tetrachloroethylene, turpentine, hexane, petroleum ether, acetone, methyl ethyl ketone, methyl isobutyl ketone, diisobutyl ketone, toluene, xylene, d-limonene, methyl acetate, ethyl acetate, n-butyl acetate, isobutyl acetate, ethanol, propanol, butanol, and combinations thereof.

5. The method of claim 1, wherein forming the liquid coating mixture to comprise the cross-linking agent and the polymer dissolved within the solvent further comprises selecting the cross-linking agent from the group consisting of organic peroxides, sulfur-comprising compounds, selenium-comprising compounds, and tellurium-comprising compounds.

6. The method of claim 1, wherein forming the liquid coating mixture to comprise the cross-linking agent and the polymer dissolved within the solvent further comprises adding a filler material selected from the group consisting of carbon black, a silica, a silicate, calcium carbonate, magnesium carbonate, kaolin, dolomite, chalk, feldspar, mica, barium sulfate, and combinations thereof.

7. The method of claim 1, wherein forming the liquid coating mixture to comprise the cross-linking agent and the polymer dissolved within the solvent further comprises adding a micro-encapsulated filler material.

8. The method of claim 1, wherein forming the liquid coating mixture to comprise the cross-linking agent and the polymer dissolved within the solvent further comprises adding a fullerene filler material.

9. The method of claim 1, wherein evaporating the solvent from the first coat comprises evaporating the solvent from the first coat at a temperature not exceeding 150° C.

10. The method of claim 1, wherein cross-linking the polymer comprises cross-linking the polymer at a temperature exceeding 150° C.

11. The method of claim 1, wherein forming the first mixture to comprise the cross-linking agent and the organic solvent comprises forming the first mixture to comprise the cross-linking agent, the organic solvent, and a fullerene.

12. The method of claim 1, further comprising adding another amount of the first mixture to the liquid coating mixture to decrease a viscosity of the liquid coating mixture.

13. The method of claim 1, further comprising adding a micro-encapsulated material to the liquid coating mixture.

14. The method of claim 1, wherein:
    forming the first mixture to comprise the cross-linking agent and the organic solvent comprises forming the first mixture to comprise a sulfur-comprising cross-linking agent and methyl ethyl ketone solvent;
    dissolving the polymer within the first mixture comprises dissolving a fluorocarbon rubber within the first mixture;
    applying the first coat of the liquid coating mixture upon the article comprises applying the first coat of the liquid coating mixture upon a downhole tool, comprising:
        dipping the downhole tool within the liquid coating mixture;
        removing the downhole tool from the liquid coating mixture; and
        rotating the downhole tool to encourage even distribution of the liquid coating mixture upon the downhole tool;
    evaporating the solvent from the first coat comprises evaporating the methyl ethyl ketone solvent from the first coat at a temperature exceeding 50° C. but not exceeding 100° C.;
    applying the second coat of the liquid coating mixture upon the first coat on the article comprises applying the second coat of the liquid coating mixture upon the first coat on the downhole tool, comprising:
        dipping the first coat on the downhole tool within the liquid coating mixture;
        removing the first coat on the downhole tool from the liquid coating mixture; and
        rotating the downhole tool to encourage even distribution of the liquid coating mixture upon the first coat on the downhole tool; and
    cross-linking the polymer comprises cross-linking the first coat and the second coat at a temperature exceeding 150° C.;
    wherein the liquid coating mixture comprises at least 75% by weight methyl ethyl ketone and at least 15% by weight fluorocarbon rubber.

15. The method of claim 1, wherein the article comprises a metal-comprising exterior surface.

16. The method of claim 1, wherein the article comprises an elastomer-comprising exterior surface.

17. The method of claim 1, wherein forming the liquid coating mixture to comprise the cross-linking agent and the polymer dissolved within the solvent further comprises adding a lubricant to the first mixture.

* * * * *

UNITED STATES PATENT AND TRADEMARK OFFICE
CERTIFICATE OF CORRECTION

| | | |
|---|---|---|
| PATENT NO. | : 8,431,192 B2 | Page 1 of 1 |
| APPLICATION NO. | : 13/177803 | |
| DATED | : April 30, 2013 | |
| INVENTOR(S) | : Gabriela Wiese et al. | |

It is certified that error appears in the above-identified patent and that said Letters Patent is hereby corrected as shown below:

In the specification:
COLUMN 11, LINE 12, change "and a combinations" to --and combinations--

Signed and Sealed this
Twenty-ninth Day of December, 2015

Michelle K. Lee
*Director of the United States Patent and Trademark Office*